R. E. DEANE.
Culinary Boiler.

No. 201,165. Patented March 12, 1878.

WITNESSES.
W. H. Hicks
George W. Allen

Royal E. Deane by A. Sidney Doane atty

INVENTOR.

UNITED STATES PATENT OFFICE.

ROYAL E. DEANE, OF NEW YORK, N. Y.

IMPROVEMENT IN CULINARY BOILERS.

Specification forming part of Letters Patent No. 201,165, dated March 12, 1878; application filed December 27, 1877.

*To all whom it may concern:*

Be it known that I, ROYAL E. DEANE, of the city, county, and State of New York, have invented, made, and applied to use Improvements in the Construction of Culinary Boilers; and that the following is a full, clear, and correct description of the same, reference being had to the accompanying drawing, making part of this specification, and to the letters of reference marked thereon, in which—

Figure 1:
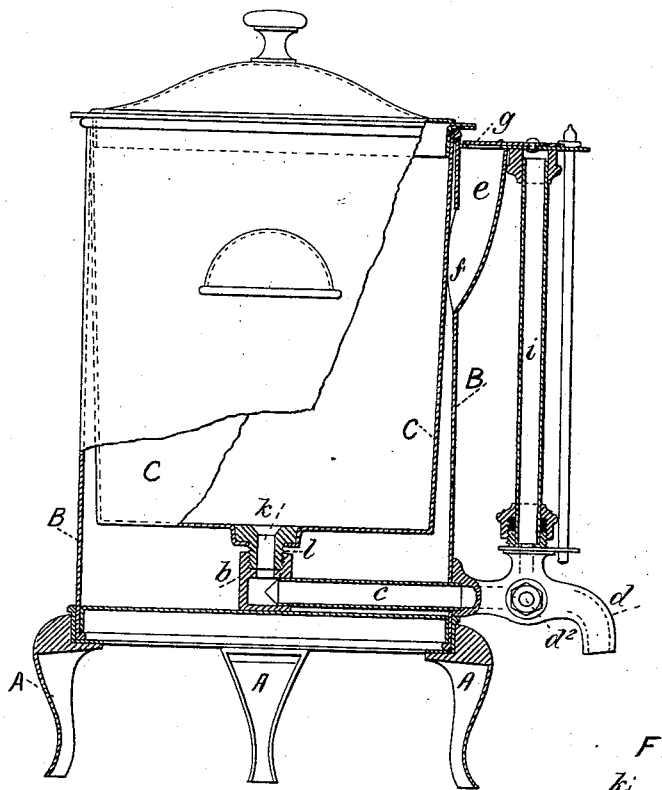
Figure 3:
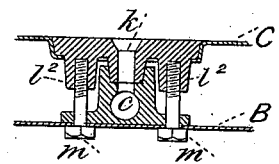
Figure 2:
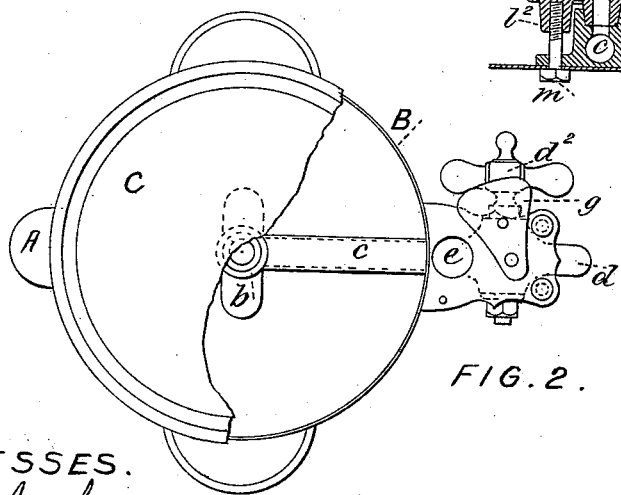

Figure 1 is a sectional elevation of my culinary boiler. Fig. 2 is a plan view of the same. Fig. 3 is a section of the inner and outer vessels when secured by bolts.

In the drawing like parts of the invention are designated by the same letters of reference.

The nature of the present invention relates to certain improvements in culinary boilers, as more fully hereinafter set forth, and pertains more particularly to the means for connecting together the inner and outer vessels of which the boiler is composed, so that provision is made for the easy and ready removal of the inner vessel from within the outer one, when required.

Heretofore the outer and inner vessels of which the culinary boiler is composed have been connected by providing each with a flange at the top, which have been placed one over the other and soldered or bolted together.

When necessary to repair the inner boiler, (the one more apt to be affected by the use to which the boiler is put,) the two, connected together as described, are taken to the manufactory or repair-shop, unsoldered, the bolts removed, and the inner vessel removed from the outer one, repaired, replaced, and refastened to the outer vessel, and the two together sent back to the party using them.

To enable those skilled in the arts to make and use my invention, I will describe its construction and operation.

A shows a stand for supporting my culinary boiler, and B is the outer vessel, within which the inner vessel C is received. This outer vessel is provided with a tube, $b$, rising vertically a short distance and placed about centrally in it, which tube $b$ communicates with a tube, $c$, extending from it through the side of the vessel, where it communicates with the faucet $d$.

The tube $b$ is provided upon its interior with a screw-thread, the object of which will be more fully hereinafter set forth.

Upon the outside of the vessel B is placed the supply-chamber $e$, having an opening in its upper plate or top, by which water is supplied to the water-space between the outer and inner vessels, an opening, $f$, being made in the side of the outer vessel B from its interior a short distance below the opening in the supply-chamber, so that the water introduced into the same passes directly into the space between the inner and outer vessels B and C.

A movable plate, $g$, swiveled at one end, and placed in a horizontal position, may be used as a cover to this supply-chamber, and may be turned aside to give access to it, and is placed over the opening to the supply-chamber when not necessary to supply the same with water.

Directly over the faucet $d$, provided with a three-way cock, $d^2$, with which it communicates, is placed a water glass or gage, $i$, intended to show the quantity or height of contents contained in the inner vessel C. C shows the inner vessel, made gradually smaller than the outer vessel B, so that when the inner vessel is placed within the outer one there shall be a water or steam space between the two vessels. The inner vessel is provided with a central opening, $k$, in its bottom, which, when the inner vessel is placed within the outer vessel, will be directly in line with and communicate with the tube $b$.

Upon the under side of the inner vessel, directly in line with the opening $k$, is placed the collet $l$, having the circular opening and a screw-thread cut upon its exterior, so that when the inner vessel is placed within the outer one this screw-thread will engage with the screw-thread upon the interior of the tube $b$.

Such being the construction, the operation will be easily understood. The inner vessel C is placed within the outer vessel B, and the screw-thread upon the collet $l$ engages with the screw-thread upon the interior of the tube $b$, and as the inner vessel is turned around within the outer vessel the threads continue to engage until the turned-over upper portion of the inner vessel is brought to bear upon the upper surface of the outer vessel. Thus the inner vessel is securely fastened within the outer vessel and its contents may be drawn off by opening the faucet, and thus allowing its contents to pass out through the opening in the bottom of the vessel and through the tubes $b$ and $c$ to the faucet $d$.

As the glass $i$ communicates with the faucet the liquid contained in it falls when the faucet is opened to draw off a portion of the contents of the inner vessel, and when the faucet is closed a sufficient quantity of the contents of the inner vessel rises in the glass to a height corresponding with the height of the contents of the inner vessel.

When necessary to repair the inner vessel, the same may be removed from its position within the outer vessel by simply unscrewing it, taking it out, repairing it, and then restoring it to its former position. Time, labor, and expense are thus saved to the consumer.

When impracticable (as perhaps in the case of very large boilers) to make use of the threaded tube and the threaded collet as a means for connecting the inner and outer vessels, the inner vessel may have placed upon its under side the collets $l^2$, threaded upon their interior, with which the bolts $m$, introduced through openings in the bottom of the outer vessel, will engage. This mode of securing the inner vessel within the outer one is clearly shown in Fig. 3 of the drawing.

Having now set forth my invention, what I claim as new is—

1. A culinary boiler composed of an outer vessel, B, provided with a tube, $b$, threaded upon its interior, and an inner vessel, C, provided with a collet, $l$, threaded upon its exterior, substantially as and for the purpose set forth.

2. In a culinary boiler composed of an inner vessel, C, and an outer vessel, B, connected substantially as shown, the combination, with the outer vessel B, of a supply-chamber, $e$, a faucet, $d$, and a water-glass, $i$, communicating with the faucet $d$, substantially as and for the purposes indicated.

ROYAL E. DEANE.

Witnesses:
A. SIDNEY DOANE,
WILLIAM V. H. HICKS.